US012606395B2

(12) United States Patent
Ando

(10) Patent No.: US 12,606,395 B2
(45) Date of Patent: Apr. 21, 2026

(54) FEEDING DEVICE AND IMAGE FORMING SYSTEM INCLUDING SAME

(71) Applicant: KYOCERA Document Solutions Inc., Osaka (JP)

(72) Inventor: Satoshi Ando, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/978,394

(22) Filed: Dec. 12, 2024

(65) Prior Publication Data

US 2025/0206559 A1 Jun. 26, 2025

(30) Foreign Application Priority Data

Dec. 20, 2023 (JP) ................................. 2023-214784

(51) Int. Cl.
*B65H 3/48* (2006.01)
*B41J 11/00* (2006.01)
(Continued)

(52) U.S. Cl.
CPC ............ *B65H 3/48* (2013.01); *B41J 11/0015* (2013.01); *B65H 1/04* (2013.01); *G03G 21/20* (2013.01); *G03G 21/203* (2013.01); *G03G 21/206* (2013.01); *B41J 13/0018* (2013.01); *B65H 2220/01* (2013.01); *B65H 2220/02* (2013.01);
(Continued)

(58) Field of Classification Search
CPC ........................... B65H 2515/805; B65H 3/48; B65H 2515/20; B65H 2515/40; G03G 21/203; G03G 21/20; G03G 21/206
See application file for complete search history.

(56) References Cited

U.S. PATENT DOCUMENTS 7,883,084 B2 * 2/2011 Okumura ................. B65H 3/60
271/97
10,649,404 B2 * 5/2020 Aoki .................... G03G 21/206
(Continued)

FOREIGN PATENT DOCUMENTS

JP 2005-096946 A 4/2005
JP 2005-096994 A 4/2005
JP 2011057397 A * 3/2011

OTHER PUBLICATIONS

Extended European Search Report dated May 23, 2025, issued by the European Patent Office in corresponding application EP 24219759.8.

*Primary Examiner* — Jeremy R Severson
(74) *Attorney, Agent, or Firm* — Stein IP, LLC

(57) ABSTRACT

A feeding device includes a set plate, a feeding unit, a fan, a heater, a control unit and a temperature and humidity sensor. When the control unit receives a feeding start command, if the sheet to be fed by the feeding unit is coated paper, the control unit performs condition determination processing to determine whether an internal environment satisfies a predetermined condition. When the control unit determines that the predetermined condition is satisfied, the control unit starts driving of the fan and the heater, and then starts the feeding of the sheet. When the feeding of the sheet is completed, the control unit stops the driving of the heater and continues the driving of the fan regardless of whether the internal environment satisfies the predetermined condition.

8 Claims, 10 Drawing Sheets

(51) Int. Cl.
*B65H 1/04* (2006.01)
*G03G 21/20* (2006.01)
*B41J 13/00* (2006.01)

(52) U.S. Cl.
CPC ...... *B65H 2515/20* (2013.01); *B65H 2515/40* (2013.01); *B65H 2515/805* (2013.01); *B65H 2801/12* (2013.01)

(56) References Cited

U.S. PATENT DOCUMENTS

| | | | | |
|---|---|---|---|---|
| 2005/0067757 | A1 | 3/2005 | Suga et al. ...................... | 271/98 |
| 2006/0180984 | A1 | 8/2006 | Suga et al. ...................... | 271/97 |
| 2007/0080491 | A1 | 4/2007 | Suga et al. ...................... | 271/97 |
| 2010/0001454 | A1 | 1/2010 | Okumura et al. .............. | 274/97 |

* cited by examiner

FEEDING DEVICE AND IMAGE FORMING SYSTEM INCLUDING SAME

INCORPORATION BY REFERENCE

This application is based upon and claims the benefit of priority from the corresponding Japanese Patent Application No. 2023-214784 filed on Dec. 20, 2023, the entire contents of which are incorporated herein by reference.

BACKGROUND

The present disclosure relates to a feeding device and an image forming system which includes such a feeding device.

When printing is performed in an image forming apparatus, sheets are fed one by one from a bundle of a plurality of sheets which are set. The image forming apparatus prints an image on the sheet which is fed.

Here, there are various types of sheets. For example, when the sheets are coated paper, the sheets which are set are difficult to separate from each other. If the set sheets are not separated from each other, simultaneous feeding disadvantageously occurs when the sheet is fed.

Hence, some conventional image forming apparatuses apply hot air to sheets which are set to perform dehumidification.

SUMMARY

A feeding device according to a first aspect of the present disclosure includes a set plate, a feeding unit, a fan, a heater, a control unit and a temperature and humidity sensor. On the set plate, a sheet is set. The feeding unit feeds the sheet from the set plate. The fan blows air to the sheet on the set plate. The heater heats the air to be blown to the sheet on the set plate. The control unit controls the feeding of the sheet performed by the feeding unit. The temperature and humidity sensor detects an internal temperature and an internal humidity of the feeding device. When the control unit receives a feeding start command from a feeding destination of the sheet, if the sheet to be fed by the feeding unit is coated paper, the control unit recognizes an internal environment of the feeding device based on an output of the temperature and humidity sensor and performs condition determination processing to determine whether the internal environment satisfies a predetermined condition. When the control unit determines that the predetermined condition is satisfied in the condition determination processing, the control unit starts driving of the fan and the heater and then causes the feeding unit to start the feeding of the sheet. When the feeding of the sheet in a state where the fan and the heater are driven is completed, the control unit stops the driving of the heater and continues the driving of the fan regardless of whether the internal environment satisfies the predetermined condition.

An image forming system according to a second aspect of the present disclosure includes the feeding device described above and an image forming apparatus coupled to the feeding device. The feeding device feeds the sheet to the image forming apparatus. The image forming apparatus performs printing on the sheet fed from the feeding device.

DETAILED DESCRIPTION

A feeding device 100 according to an embodiment of the present disclosure and an image forming system 100S which includes the feeding device 100 will be described below with reference to FIGS. 1 to 10.

Configuration of Image Forming System

Figure 1:
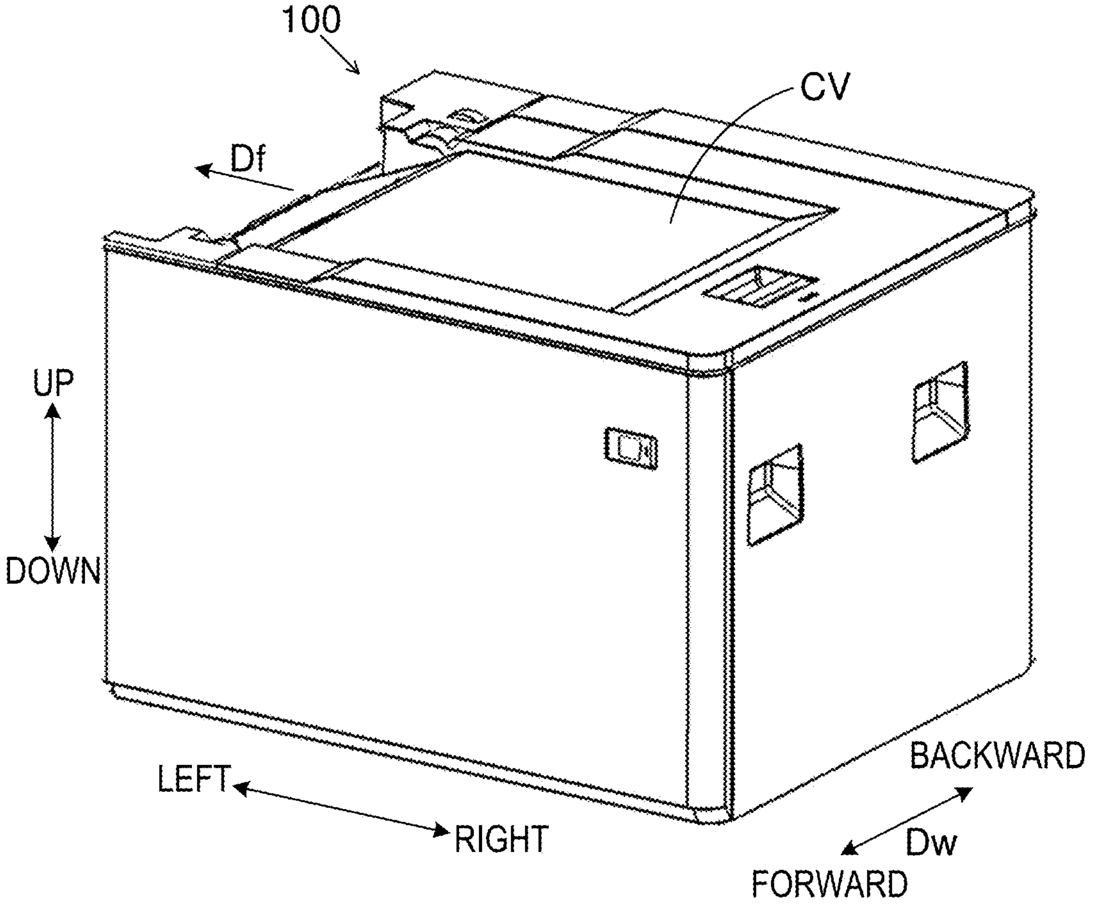
FIG. 1 is a perspective view of a feeding device according to an embodiment.
Figure 2:
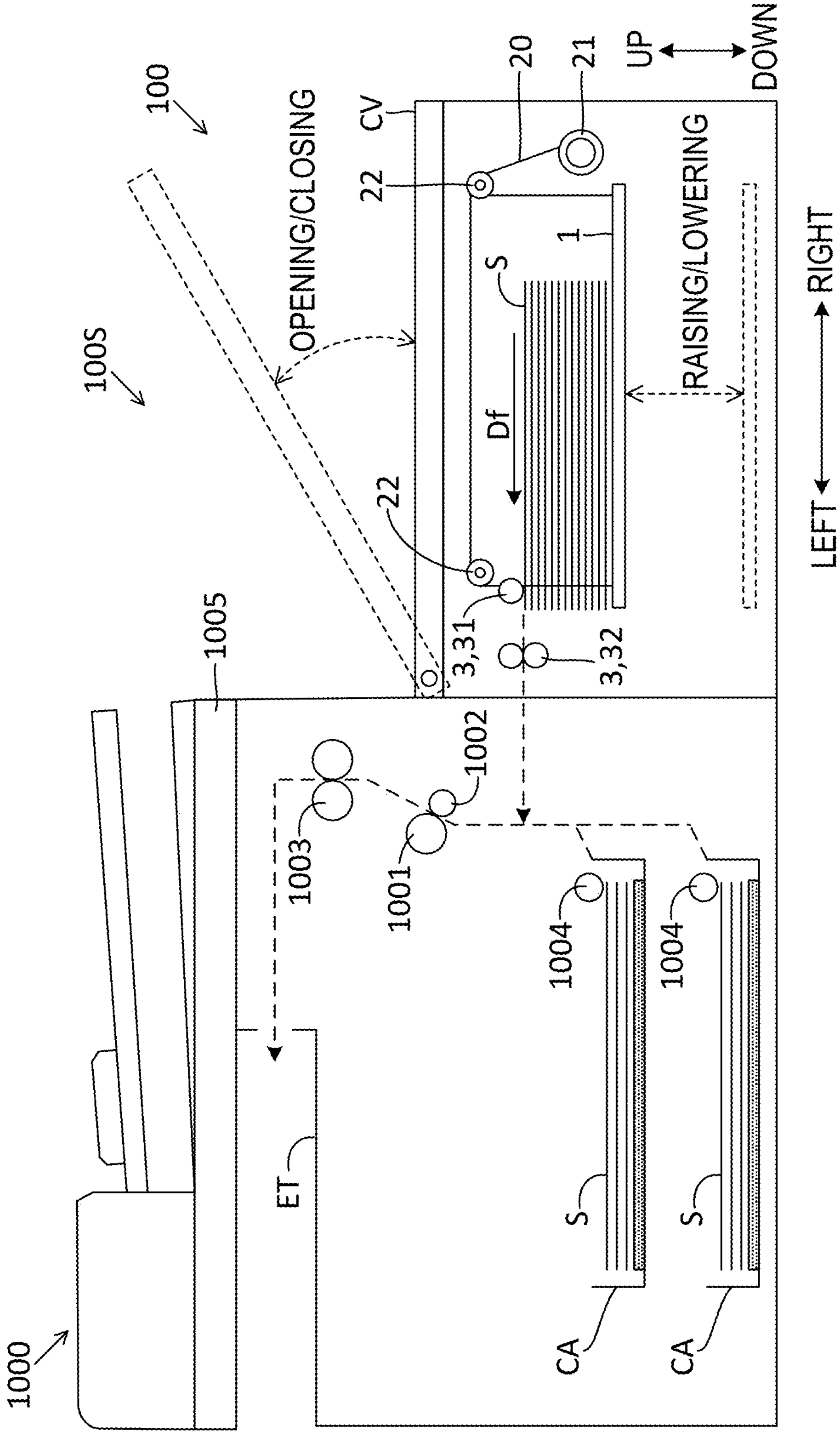
FIG. 2 is a schematic view of an image forming system which includes the feeding device according to the embodiment.

The feeding device 100 has an external appearance as shown in FIG. 1. As shown in FIG. 2, the feeding device 100 is coupled to an image forming apparatus 1000. The feeding device 100 is coupled to the image forming apparatus 1000 to form the image forming system 100S together with the image forming apparatus 1000. FIG. 2 is a schematic view of the image forming system 100S (that is, the feeding device 100 coupled to the image forming apparatus 1000). FIG. 2 corresponds to a case where the image forming system 100S is viewed from the front.

The feeding device 100 is placed on a floor surface together with the image forming apparatus 1000. A direction perpendicular to the floor surface (flat surface) on which the feeding device 100 is placed is the up/down direction of the feeding device 100.

The feeding device 100 may be removable with respect to the image forming apparatus 1000. The feeding device 100 is, for example, an optional device. The feeding device 100 when viewed from the front of the image forming apparatus 1000 is arranged on the right side of the image forming apparatus 1000.

The feeding device 100 stores sheets S. The type of sheets S is not particularly limited. In the feeding device 100, various types of sheets S such as plain paper and coated paper can be stored. The feeding device 100 feeds the sheet S to the image forming apparatus 1000.

The feeding device 100 feeds the sheet S from the right side of the image forming apparatus 1000 toward the image forming apparatus 1000. In the following description, a feeding direction in which the sheet S is fed by the feeding device 100 is identified with a symbol Df. A direction parallel to the feeding direction Df is the left/right direction of the feeding device 100. An upstream side in the feeding direction Df is the right side of the feeding device 100, and a downstream side in the feeding direction Df is the left side of the feeding device 100.

The feeding direction Df is one direction of horizontal directions orthogonal to the up/down direction. A direction which is horizontally orthogonal to the feeding direction Df corresponds to the width direction of the feeding device 100. In the following description, the width direction of the feeding device 100 is identified with a symbol Dw. The width direction Dw is also the forward/backward direction of the feeding device 100.

The image forming apparatus 1000 prints an image on the sheet S fed from the feeding device 100. The printing system of the image forming apparatus 1000 is an electrophotographic system. The printing system of the image forming apparatus 1000 may be an inkjet system.

Configuration of Image Forming Apparatus

The image forming apparatus 1000 coveys the sheet S fed from the feeding device 100 along a conveyance path. The image forming apparatus 1000 prints the image on the sheet S being conveyed. In FIG. 2, the conveyance path of the sheet S is represented by an arrow with dashed lines.

The image forming apparatus 1000 includes a photosensitive drum 1001 and a transfer roller 1002. The photosensitive drum 1001 carries a toner image on its circumferential surface. The transfer roller 1002 is pressed against the photosensitive drum 1001 to form a transfer nip between itself and the photosensitive drum 1001. The transfer roller 1002 is rotated together with the photosensitive drum 1001. The sheet S being conveyed enters the transfer nip, and thus transfer processing is performed on the sheet S, with the result that the toner image is transferred to the sheet S.

The image forming apparatus 1000 further includes a charging device, an exposure device and a development device though they are not shown in the figure. The charging device charges the circumferential surface of the photosensitive drum 1001. The exposure device forms an electrostatic latent image on the circumferential surface of the photosensitive drum 1001. The development device develops the electrostatic latent image on the circumferential surface of the photosensitive drum 1001 into the toner image.

The image forming apparatus 1000 includes a fixing roller pair 1003. The fixing roller pair 1003 includes a heating roller and a pressure roller. The heating roller incorporates a heater. The pressure roller is pressed against the heating roller to form a fixing nip between itself and the heating roller. The pressure roller is rotated together with the heating roller. The sheet S being conveyed enters the fixing nip, and thus fixing processing is performed on the sheet S. The toner image is fixed to the sheet S. The sheet S which has passed through the fixing nip is ejected to an ejection tray ET.

The image forming apparatus 1000 includes a feeding roller 1004. The feeding roller 1004 feeds a sheet S to the conveyance path from a sheet cassette CA inside the main body of the image forming apparatus 1000. In other words, the image forming apparatus 1000 can also perform printing on sheets S set in the sheet cassette CA.

The image forming apparatus 1000 also includes an image reading device 1005. The image reading device 1005 reads a document to generate image data of the document. The image forming apparatus 1000 can print an image based on the image data of the document on the sheet S (that is, can copy the document).

Configuration of Feeding Device

Figure 3:
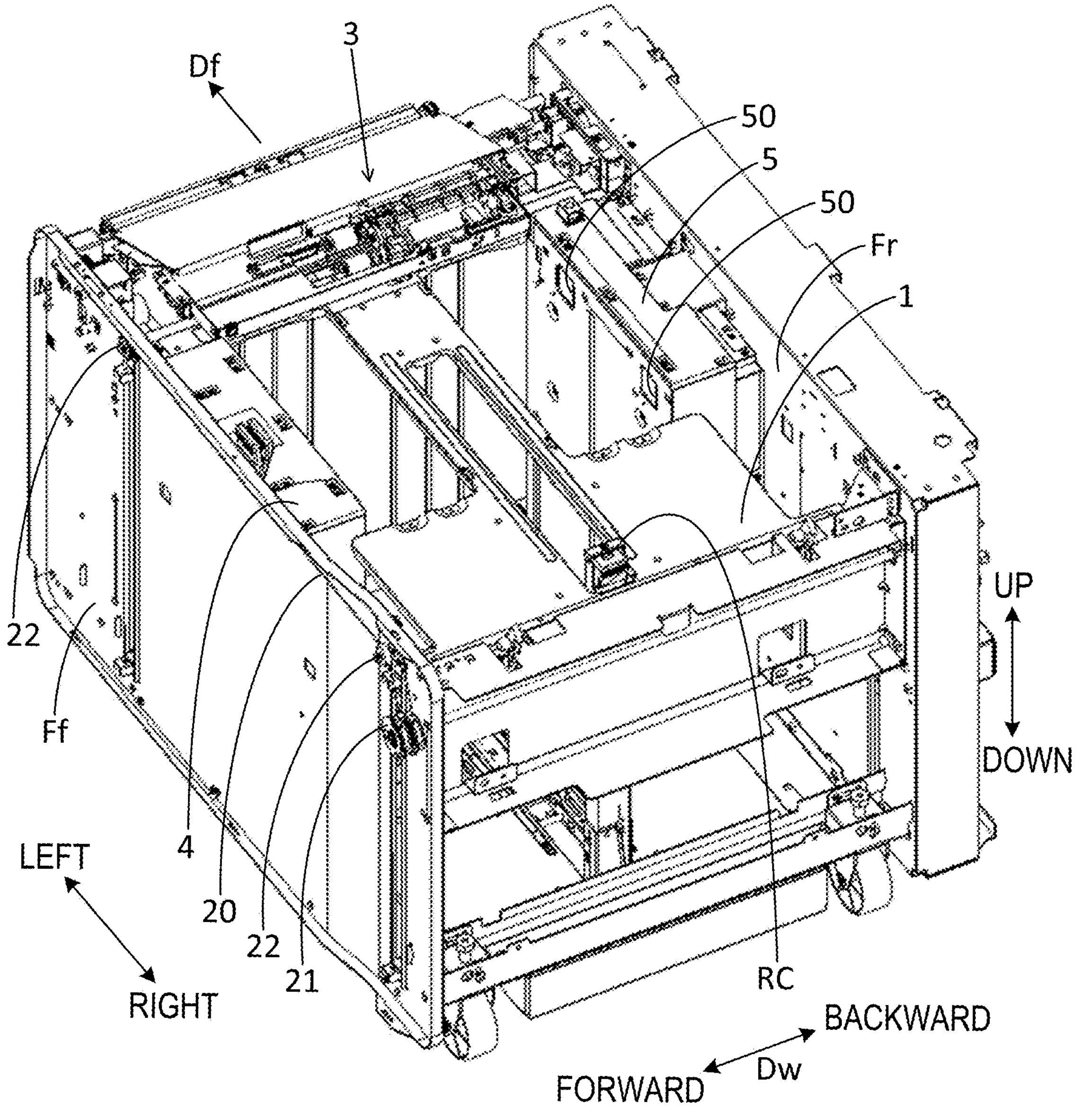
FIG. 3 is a perspective view in a state where an exterior cover in the feeding device according to the embodiment is omitted.

As shown in FIG. 3, the feeding device 100 includes a front frame Ff and a rear frame Fr which are arranged opposite each other in the width direction Dw. The front frame Ff and the rear frame Fr are made of sheet metal. The front frame Ff is arranged on a front side, and the rear frame Fr is arranged on a back side.

The feeding device 100 includes, as a sheet storage region, a region between the front frame Ff and the rear frame Fr in the width direction Dw. The sheet storage region is covered by an upper surface cover CV (see FIGS. 1 and 2) from above. In other words, the feeding device 100 includes the upper surface cover CV. The upper surface cover CV corresponds to a "cover".

The upper surface cover CV is supported to be turnable with respect to the front frame Ff and the rear frame Fr. The upper surface cover CV is turnable around an axis line extending in the width direction Dw. The upper surface cover CV is turned with a left side end portion used as a support point such that a right side end portion swings vertically. In other words, the upper surface cover CV is opened and closed with respect to an upper opening in the sheet storage region. Furthermore, in other words, the upper surface cover CV is supported to be openable and closable.

The feeding device 100 includes a set plate 1. The set plate 1 is made of sheet metal. The set plate 1 is arranged between the front frame Ff and the rear frame Fr in the width direction Dw. On the set plate 1, the sheets S are set. In other words, a region on the set plate 1 is the sheet storage region. When a plurality of sheets S are provided, the sheets S are stacked on the set plate 1 in the up/down direction.

When a user performs an operation for setting the sheets S on the set plate 1, the upper surface cover CV is opened and closed. In a state where the upper surface cover CV is closed, the right side end portion of the upper surface cover CV is turned upward, and thus the upper surface cover CV can be brought into an opened state. In a state where the upper surface cover CV is opened, the right side end portion of the upper surface cover CV is turned downward, and thus the upper surface cover CV can be brought into a closed state.

The upper surface cover CV is opened, and thus the sheet storage region on the set plate 1 is exposed. In this way, the sheets S can be set on the set plate 1. The upper surface cover CV is closed, and thus the sheet storage region on the set plate 1 is covered.

Figure 4:
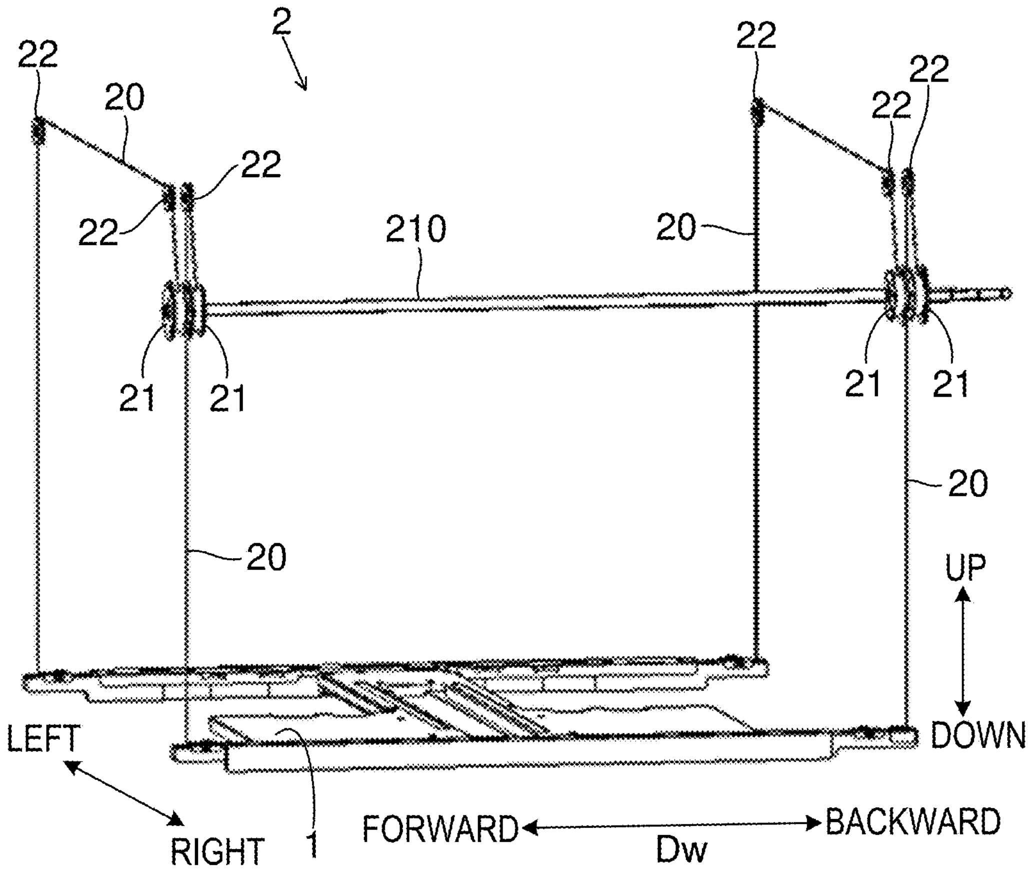
FIG. 4 is a perspective view of a raising/lowering mechanism for a set plate in the feeding device according to the embodiment.

The feeding device 100 includes a raising/lowering mechanism 2. The configuration of the raising/lowering mechanism 2 is shown in FIG. 4. The raising/lowering mechanism 2 moves the set plate 1 in the up/down direction. In other words, the set plate 1 is supported to be able to reciprocate in the up/down direction. The raising/lowering mechanism 2 raises the set plate 1, and thus the vertical position of the sheet S in the uppermost layer set on the set plate 1 is held to a predetermined position.

The raising/lowering mechanism 2 includes wires 20 which are coupled to the set plate 1. The number of wires 20 is four. Ends of the wires 20 are respectively coupled to the four corners of the set plate 1. A winding drum 21 and a relay pulley 22 are assigned to each of the wires 20. Each of the wires 20 is wound around the corresponding relay pulley 22. The other end of each of the wires 20 is coupled to the corresponding winding drum 21.

Each of the winding drums 21 is supported rotatably around the same axis line extending in the width direction Dw. In other words, the winding drums 21 are attached to the same rotation shaft 210, and are rotated together with the rotation shaft 210. The rotation shaft 210 is coupled to an unillustrated winding motor, and the winding motor is driven to rotate the rotation shaft 210. Each of the winding drums 21 is rotated in forward and reverse directions to wind and unwind the wire 20. In other words, the set plate 1 is raised and lowered.

As shown in FIGS. 2 and 3, the feeding device 100 includes a feeding unit 3. The feeding unit 3 corresponds to a "feeding unit". The feeding unit 3 performs a feeding operation to feed the sheet S from the set plate 1. By the feeding unit 3, the sheet S on the set plate 1 is fed from the feeding device 100 to the image forming apparatus 1000. The feeding unit 3 includes a pickup roller 31 and a conveyance roller pair 32.

The pickup roller 31 is rotatably supported. In a state where the sheet S is set on the set plate 1, the pickup roller 31 is arranged in such a position that the pickup roller 31 can make contact with a downstream side end portion of the sheet S in the feeding direction Df from above. The pickup roller 31 makes contact with the sheet S set on the set plate 1 from above, and is rotated in this state to pull out the sheet S from the set plate 1.

The conveyance roller pair 32 is rotatably supported. The conveyance roller pair 32 is a pair of rollers which are pressed against each other. The conveyance roller pair 32 is arranged on the downstream side in the feeding direction Df with respect to the pickup roller 31. The conveyance roller pair 32 nips the sheet S pulled out from the set plate 1 by the pickup roller 31, and is rotated. In this way, the conveyance roller pair 32 conveys the sheet S toward the image forming apparatus 1000. The number of conveyance roller pairs 32 which are installed is not particularly limited, and can be changed according to, for example, the length of the conveyance path for the sheet S from the pickup roller 31 to the image forming apparatus 1000.

The raising/lowering mechanism 2 raises the set plate 1 to cause the sheet S in the uppermost layer on the set plate 1 to make contact with the pickup roller 31. When the sheet S is continuously fed from the feeding device 100 to the image forming apparatus 1000, the raising/lowering mechanism 2 raises the set plate 1 and stops the raising repeatedly. In this way, the contact of the sheet S in the uppermost layer on the set plate 1 with the pickup roller 31 is maintained.

Figure 5:
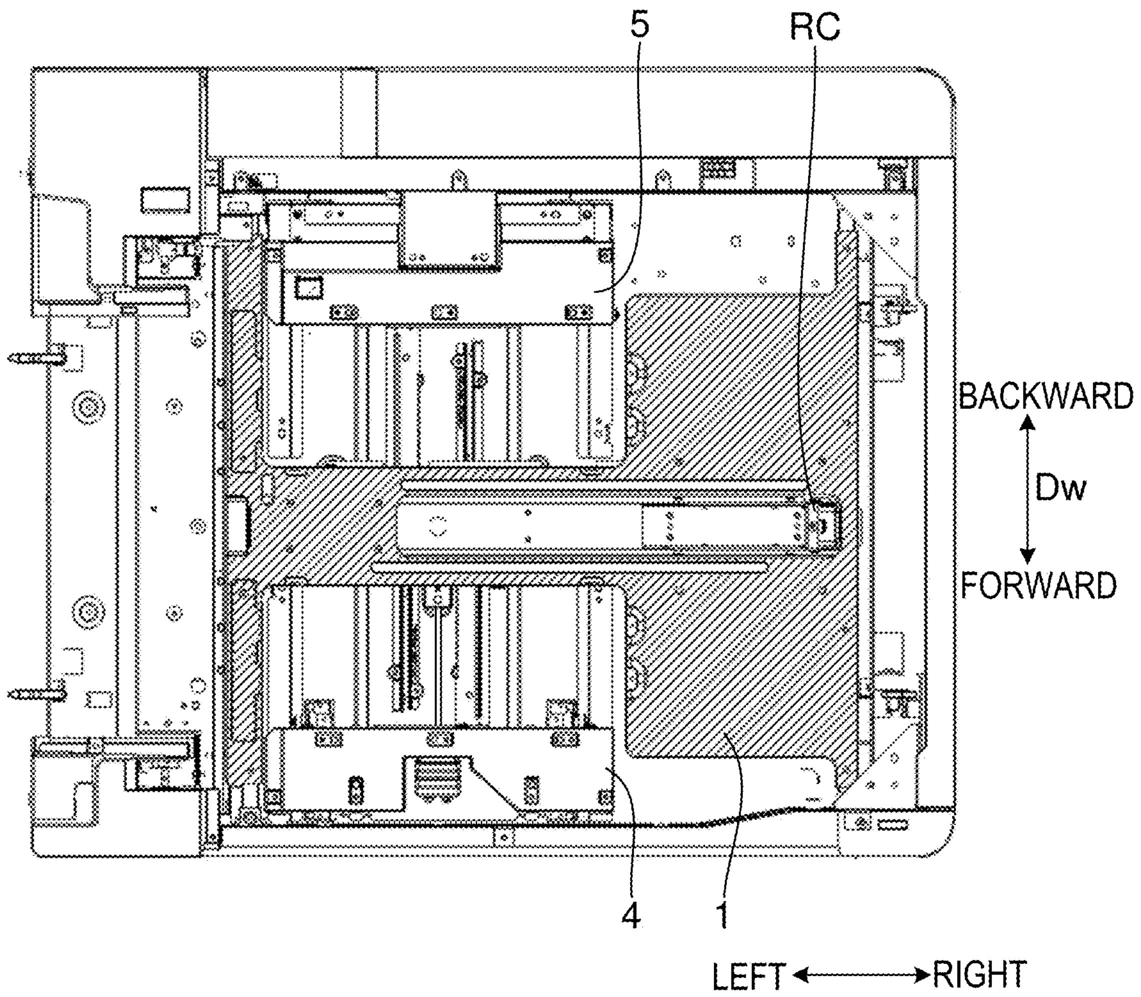
FIG. 5 is a plan view when a sheet storage region in the feeding device according to the embodiment is viewed from above.

As shown in FIGS. 3 and 5, the feeding device 100 includes width-direction restriction cursors 4 and 5. The width-direction restriction cursors 4 and 5 are supported to be able to reciprocate in the width direction Dw. The width-direction restriction cursors 4 and 5 are arranged opposite each other in the width direction Dw with a distance provided therebetween. The user performs an operation, and thus the width-direction restriction cursors 4 and 5 are moved in the width direction Dw.

The width-direction restriction cursors 4 and 5 are moved in the width direction Dw in conjunction with each other. When the width-direction restriction cursor 4 is moved backward, the width-direction restriction cursor 4 is moved forward, and thus the distance between the width-direction restriction cursors 4 and 5 in the width direction Dw is decreased. When the width-direction restriction cursor 4 is moved forward, the width-direction restriction cursor 5 is moved backward, and thus the distance between the width-direction restriction cursors 4 and 5 in the width direction Dw is increased.

The width-direction restriction cursors 4 and 5 are moved in the width direction Dw to make contact with end edges of the sheet S on the set plate 1 in the width direction Dw. The width-direction restriction cursor 4 is moved from forward to backward to make contact with the end edge of the sheet S on the set plate 1 from forward. The width-direction restriction cursor 5 is moved from backward to forward to make contact with the end edge of the sheet S on the set plate 1 from backward. In this way, the width-direction restriction cursors 4 and 5 restrict a displacement of the sheet S on the set plate 1 in the width direction Dw.

The feeding device 100 further includes a rear end restriction cursor RC. The rear end restriction cursor RC is supported to be able to reciprocate in the left/right direction. The user performs an operation, and thus the rear end restriction cursor RC is moved in the left/right direction. The rear end restriction cursor RC is moved from the upstream side to the downstream side in the feeding direction Df to make contact with the back end edge of the sheet S on the set plate 1. In this way, the rear end restriction cursor RC restricts a displacement of the sheet S on the set plate 1 to the upstream side in the feeding direction Df.

When the set plate 1 is viewed from above, the set plate 1 includes an opening (the symbol of which is omitted) on the movement paths of the width-direction restriction cursors 4 and 5, and also includes an opening (the symbol of which is omitted) on the movement path of the rear end restriction cursor RC. Hence, even when the width-direction restriction cursors 4 and 5 are moved in the width direction Dw, the width-direction restriction cursors 4 and 5 do not make contact with the set plate 1. Even when the rear end restriction cursor RC is moved in the left/right direction, the rear end restriction cursor RC does not make contact with the set plate 1. In other words, when the set plate 1 is viewed from above, even if the sheet S is smaller than the set plate 1, the width-direction restriction cursors 4 and 5 can be brought into contact with the end edges of the sheet S without making contact with the set plate 1, and the rear end restriction cursor RC can be brought into contact with the end edge of the sheet S without making contact with the set plate 1. In FIG. 5, the set plate 1 is hatched.

Figure 6:
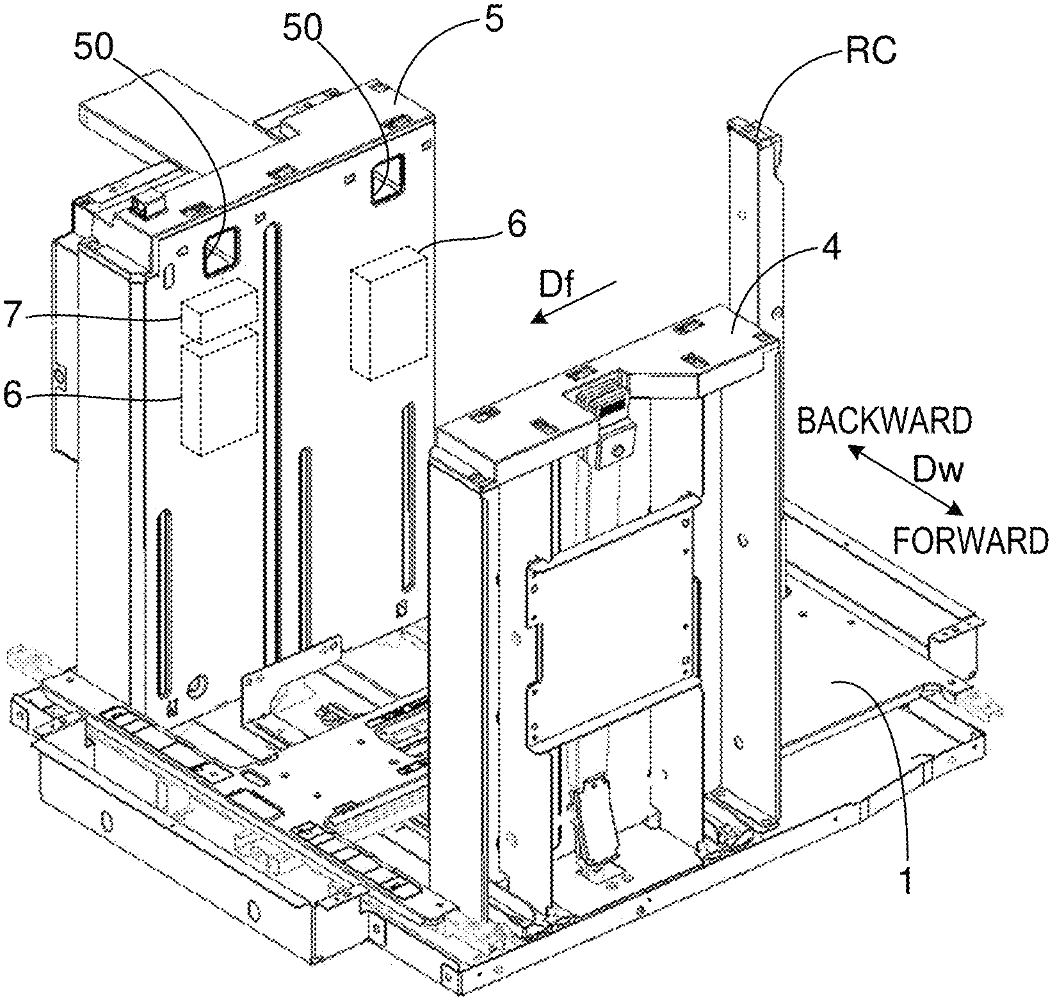
FIG. 6 is a perspective view of width-direction restriction cursors in the feeding device according to the embodiment and an area in the vicinity thereof.
Figure 7:
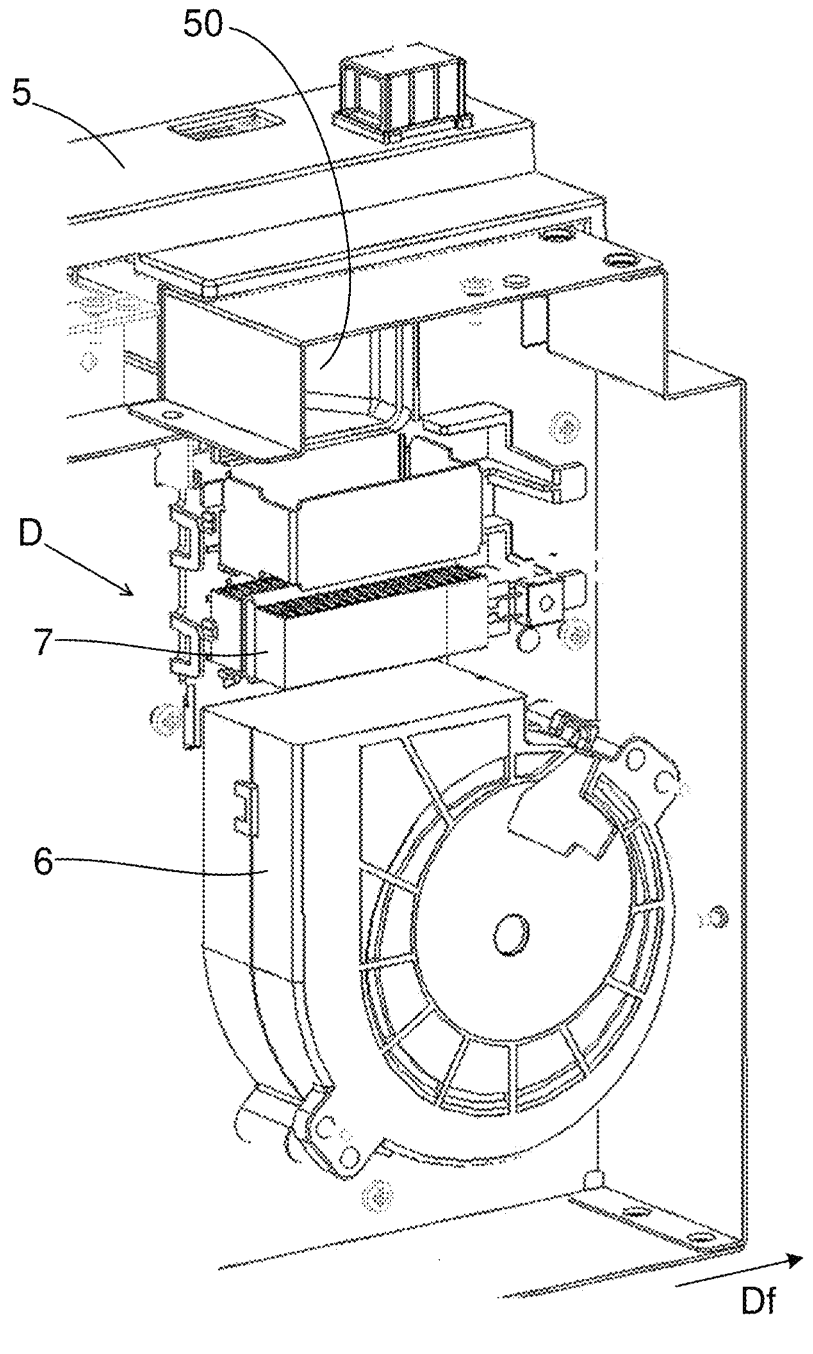
FIG. 7 is a perspective view of a dehumidification unit in the feeding device according to the embodiment.

As shown in FIGS. 6 and 7, the feeding device 100 includes a dehumidification unit D. The dehumidification unit D blows heated air to the sheet storage region on the set plate 1. In other words, the dehumidification unit D applies the hot air to the sheets S on the set plate 1. In this way, the dehumidification unit D performs dehumidification for the sheets S on the set plate 1.

The dehumidification unit D includes a fan 6 and a heater 7. The fan 6 is driven to blow the air to the sheets S on the set plate 1. The heater 7 is arranged on the path of an airflow generated by the fan 6. The heater 7 heats the air to be blown to the sheets S on the set plate 1. In this way, the fan 6 and the heater 7 are driven to apply the hot air to the sheets S on the set plate 1, and thus dehumidification is performed for the sheets S on the set plate 1.

The fan 6 and the heater 7 are arranged in the width-direction restriction cursor 5 on the back side. In this configuration, the width-direction restriction cursor 5 corresponds to a "restriction cursor".

The fan 6 and the heater 7 are arranged outward of the width-direction restriction cursor 5 in the width direction Dw. The "outward" of the width-direction restriction cursor 5 in the width direction Dw refers to the opposite side of the width-direction restriction cursor 5 (that is, the back side of the width-direction restriction cursor 5) to the side of the sheet storage region in the width direction Dw. Hence, in the width-direction restriction cursor 5, a vent 50 which penetrates in the width direction Dw is formed. The hot air generated by the fan 6 and the heater 7 flows to the sheet storage region on the set plate 1 via the vent 50.

For example, the number of fans 6 are two. The two fans 6 are arranged along the feeding direction Df. By contrast, the number of heaters 7 is one. The one heater 7 is assigned to the fan 6 of the two fans 6 located on the downstream side in the feeding direction Df. In other words, the one fan 6 heats the air to be blown by the fan 6 of the two fans 6 located on the downstream side in the feeding direction Df.

Figure 8:
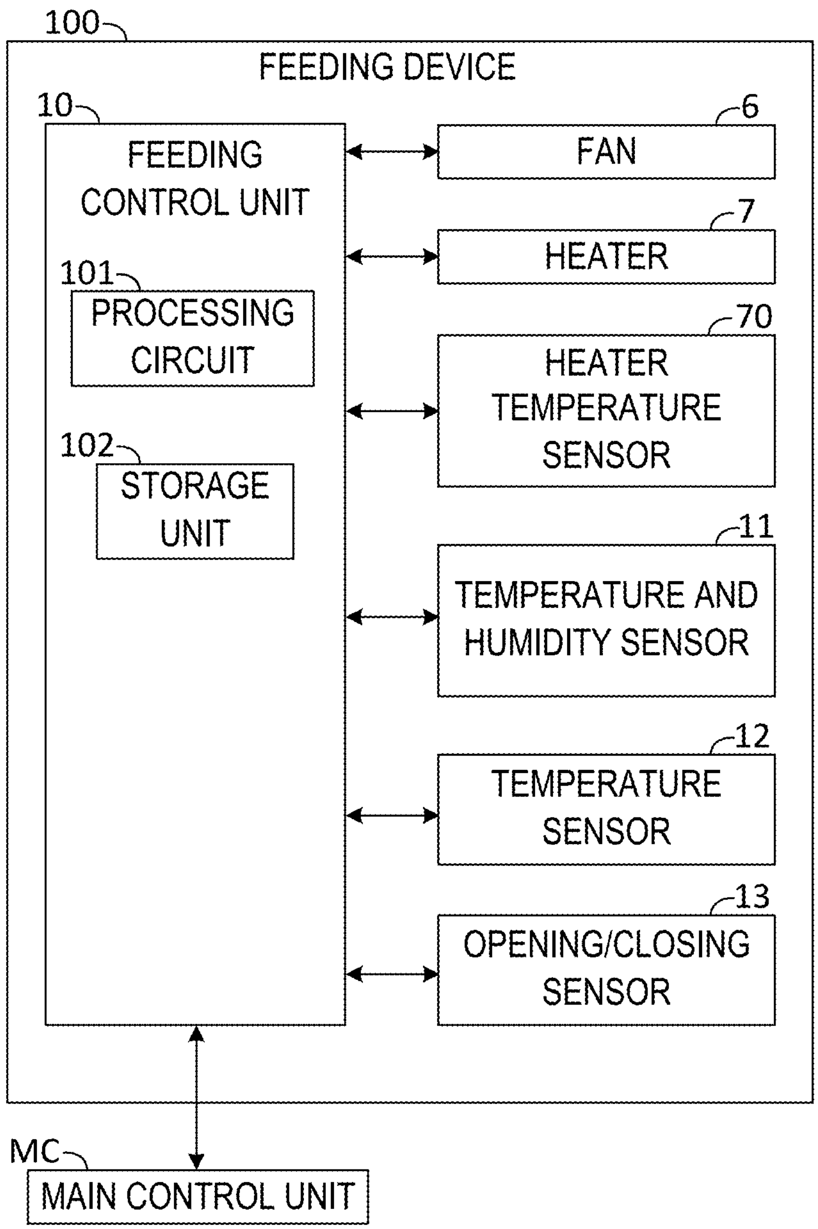
FIG. 8 is a block diagram of the feeding device according to the embodiment.

As shown in FIG. 8, the feeding device 100 includes a feeding control unit 10. The feeding control unit 10 corresponds to a "control unit". The feeding control unit 10 includes a processing circuit 101 of a CPU, an ASIC and the like. The feeding control unit 10 includes a storage unit 102 of a ROM, a RAM, a HDD, an SSD and the like.

The feeding control unit 10 is connected to a main control unit MC in the image forming apparatus 1000. The feeding control unit 10 communicates with the main control unit MC. The main control unit MC receives, from the user, a job setting related to a job for feeding the sheet S with the feeding device 100 (hereinafter simply referred to as the job). For example, in the image forming apparatus 1000, an operation panel (not shown) is provided, and the operation panel receives the job setting from the user. The main control unit MC recognizes the details of the job setting received by the operation panel.

The main control unit MC transmits, to the feeding control unit 10, a control instruction based on the job setting indicated by the user. The feeding control unit 10 controls, based on the control instruction from the main control unit MC, processing for feeding the sheet S with the feeding device 100 (in other words, processing for feeding the sheet S from the feeding device 100 to the image forming apparatus 1000).

For example, the main control unit MC transmits a feeding start command for the sheet S to the feeding control unit 10. In other words, the feeding control unit 10 receives the feeding start command from the image forming apparatus 1000 which is the feeding destination of the sheet S. After the feeding control unit 10 receives the feeding start command, the feeding control unit 10 causes the feeding unit 3 to start the feeding of the sheet S. In other words, the feeding control unit 10 rotates the rotation member (the pickup roller 31 and the conveyance roller pair 32) of the feeding unit 3. The feeding control unit 10 raises the set plate 1 to cause the sheet S in the uppermost layer on the set plate 1 to make contact with the pickup roller 31. In this way, the sheet S on the set plate 1 is fed to the image forming apparatus 1000.

The feeding control unit 10 controls dehumidification processing for the sheets S performed by the dehumidification unit D. In other words, the feeding control unit 10 controls the driving of the fan 6. The feeding control unit 10 controls the driving of the heater 7. The dehumidification processing for the sheets S performed by the dehumidification unit D will be described in detail later.

The feeding device 100 includes a temperature and humidity sensor 11. The temperature and humidity sensor 11 detects an internal temperature and an internal humidity of the feeding device 100. The temperature and humidity sensor 11 is connected to the feeding control unit 10. The feeding control unit 10 detects the internal temperature and the internal humidity of the feeding device 100 based on the output of the temperature and humidity sensor 11.

The feeding device 100 includes a temperature sensor 12. The temperature sensor 12 detects an external temperature of the feeding device 100. The temperature sensor 12 is connected to the feeding control unit 10. The feeding control unit 10 detects the external temperature of the feeding device 100 based on the output of the temperature sensor 12. Depending on circumstances, an outside air temperature detection sensor is provided in the image forming apparatus 1000, and the outside air temperature detection sensor is connected to the main control unit MC. In this case, the temperature sensor 12 may be omitted, and the main control unit MC may transmit information indicating an outside air temperature (that is, the external temperature of the feeding device 100) to the feeding control unit 10.

The feeding device 100 includes an opening/closing sensor 13. The opening/closing sensor 13 outputs a value corresponding to the opened/closed state of the upper surface cover CV. For example, when the upper surface cover CV is opened, the output value of the opening/closing sensor 13 is changed. The opening/closing sensor 13 is connected to the feeding control unit 10. The feeding control unit 10 detects, based on the output of the opening/closing sensor 13, that the upper surface cover CV has been opened and that the upper surface cover CV has been closed.

The feeding device 100 includes a heater temperature sensor 70 (for example, a thermistor). The heater temperature sensor 70 detects the temperature of the heater 7. The heater temperature sensor 70 is connected to the feeding control unit 10. The feeding control unit 10 detects the temperature of the heater 7 based on the output of the heater temperature sensor 70.

Dehumidification Processing for Sheets

Various types of sheets S are used in the job. For example, coated paper may be used. When the sheet S used in the job is the coated paper, depending on the internal temperature and the internal humidity of the feeding device 100, the wetness of the sheets S is increased, and thus the sheets S stacked on the set plate 1 are difficult to separate from each other. In this way, when the sheet S on the set plate 1 is fed, simultaneous feeding in which a plurality of sheets S are fed together easily occurs.

In order to suppress the inconvenience described above, the dehumidification unit D is provided in the feeding device 100. The dehumidification unit D performs dehumidification for the sheets S on the set plate 1. In this way, the simultaneous feeding of the sheets S is suppressed.

Here, when the dehumidification unit D is continuously driven regardless of the internal environment of the feeding device 100, power consumption is increased. Moreover, when the dehumidification unit D is continuously driven regardless of the type of sheet S, power consumption is increased. Hence, the feeding control unit 10 performs control along flows shown in FIGS. 9 and 10.

The flows of processing performed by the feeding control unit 10 will be described below with reference to flowcharts shown in FIGS. 9 and 10.

Figure 9:
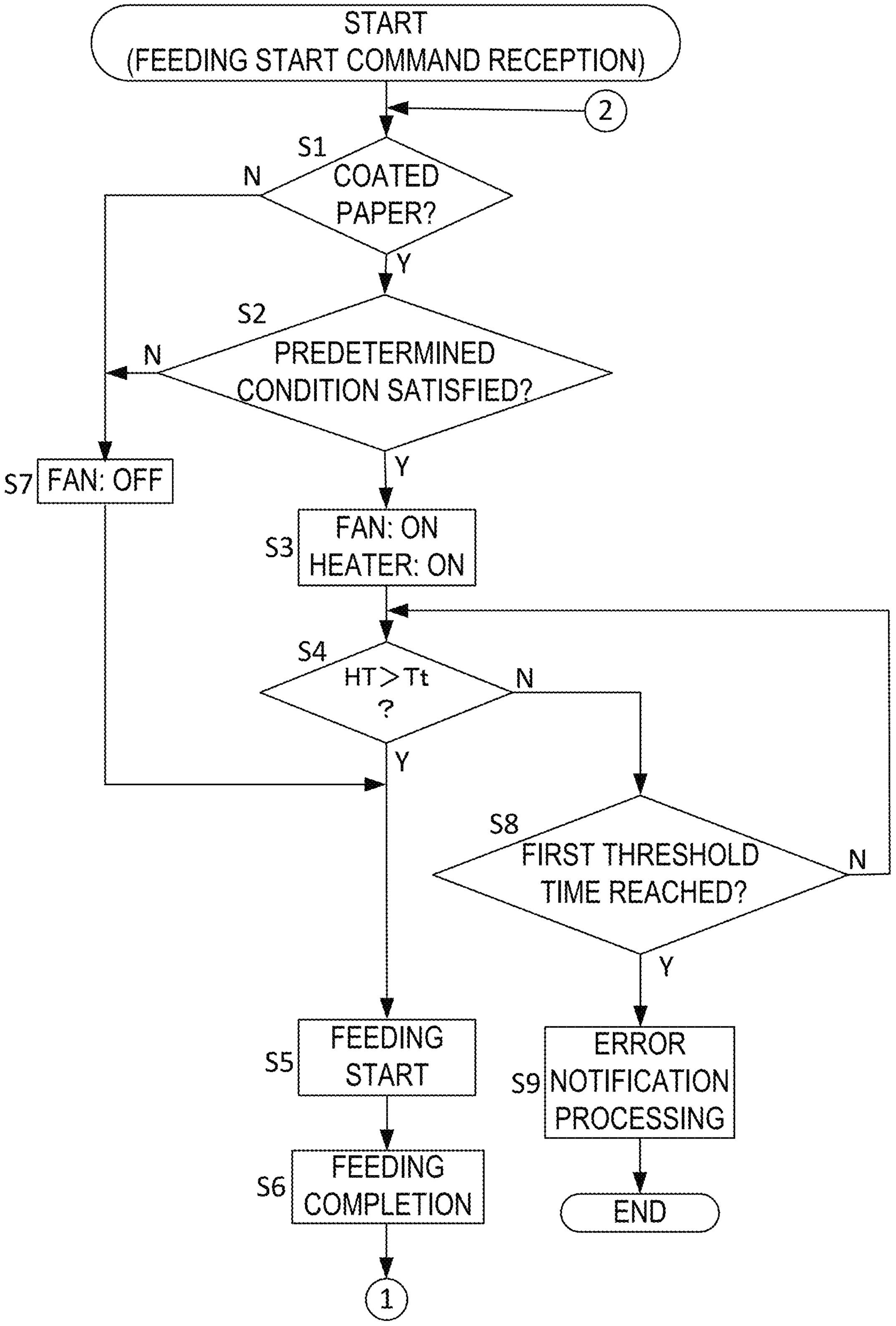
FIG. 9 is a flowchart showing the flow of processing which is performed by a feeding control unit in the feeding device according to the embodiment.

When the feeding control unit 10 receives a feeding start command from the feeding destination of the sheet S (that is, the image forming apparatus 1000), the flow shown in FIG. 9 is started. At the start of the flow shown in FIG. 9, the fan 6 may be driven or the fan 6 may not be driven. On the other hand, the heater 7 is not driven.

In step S1, the feeding control unit 10 determines whether the sheet S to be fed by the feeding unit 3 is the coated paper. In other words, the feeding control unit 10 determines whether the sheet S set on the set plate 1 is the coated paper. Furthermore, in other words, the feeding control unit 10 determines whether the sheet S used in the job is the coated paper. When in step S1, the feeding control unit 10 determines that the sheet S to be fed by the feeding unit 3 is the coated paper, the processing transfers to step S2.

For example, the operation panel in the image forming apparatus 1000 receives the type of sheet S on the set plate 1 from the user. When the user sets the sheet S on the set plate 1, the user inputs the type of sheet S set on the set plate 1 to the operation panel. The main control unit MC transmits, to the feeding control unit 10, the type of sheet S input to the operation panel. In this way, the feeding control unit 10 recognizes the type of sheet S set on the set plate 1.

In step S2, the feeding control unit 10 recognizes the internal environment of the feeding device 100 based on the output of the temperature and humidity sensor 11. Then, the feeding control unit 10 performs condition determination processing to determine whether the internal environment of the feeding device 100 satisfies a predetermined condition. In other words, when the sheet S to be fed by the feeding unit 3 is the coated paper, the feeding control unit 10 performs the condition determination processing.

When the feeding control unit 10 performs the condition determination processing, the feeding control unit 10 determines an absolute humidity based on the output of the temperature and humidity sensor 11. The feeding control unit 10 acquires the absolute humidity based on the output of the temperature and humidity sensor 11 as the internal environment of the feeding device 100. Then, the feeding control unit 10 performs, as the condition determination processing, processing for determining that the predetermined condition is satisfied when the absolute humidity based on the output of the temperature and humidity sensor 11 is higher than a threshold humidity. The feeding control unit 10 determines that the predetermined condition is not satisfied when the absolute humidity based on the output of the temperature and humidity sensor 11 is equal to or less than the threshold humidity. In other words, the condition determination processing is processing for determining whether the simultaneous feeding of the sheets S easily occurs. A state where the simultaneous feeding of the sheets S easily occurs refers to a state where the absolute humidity based on the output of the temperature and humidity sensor 11 is higher than the threshold humidity.

When in step S2, the feeding control unit 10 determines that the predetermined condition is satisfied, the processing transfers to step S3. In other words, when the feeding control unit 10 determines that the absolute humidity based on the output of the temperature and humidity sensor 11 is higher than the threshold humidity, the processing transfers to step S3. Furthermore, in other words, when the feeding control unit 10 determines that the simultaneous feeding of the sheets S easily occurs, the processing transfers to step S3.

In step S3, the feeding control unit 10 starts the driving of the fan 6 (fan: on). The feeding control unit 10 drives the fan 6 at a predetermined reference rotation speed. The feeding control unit 10 performs PWM control to drive the fan 6. Here, the feeding control unit 10 also starts the driving of the heater 7 (heater: on). When the fan 6 and the heater 7 are normally driven, the hot air is applied to the sheets S on the set plate 1, and thus dehumidification is performed.

When the feeding control unit 10 determines that the predetermined condition is satisfied in the condition determination processing, the feeding control unit 10 measures a first elapsed time that is a time which has elapsed since the start of the driving of the heater 7. In other words, when the processing transfers to step S3, the feeding control unit 10 starts the measurement of the first elapsed time.

In step S4, the feeding control unit 10 determines whether the temperature (HT) of the heater 7 is higher than a threshold temperature (Tt). When the feeding control unit 10 determines that the temperature of the heater 7 is higher than the threshold temperature (HT>Tt), the processing transfers to step S5. The threshold temperature is a temperature (external temperature+10°) which is 10 degrees higher than the external temperature of the feeding device 100. In other words, the threshold temperature is changed depending on the external temperature of the feeding device 100.

In step S5, the feeding control unit 10 causes the feeding unit 3 to start the feeding of the sheet S. In other words, when the feeding control unit 10 determines that the predetermined condition is satisfied in the condition determination processing, the feeding control unit 10 starts the driving of the fan 6 and the heater 7, and then causes the feeding unit 3 to start the feeding of the sheet S. The feeding control unit 10 causes the feeding unit 3 to feed the sheet S in a state where the upper surface cover CV is closed.

When in step S6, the feeding of the sheet S is completed, the feeding control unit 10 stops the feeding operation of the feeding unit 3.

When in step S1, the feeding control unit 10 determines that the sheet S to be fed by the feeding unit 3 is not the coated paper, the processing transfers to step S7. In step S7, the feeding control unit 10 does not drive the fan 6 (fan: off). Thereafter, the processing transfers to step S5.

When in step S7, the fan 6 is being driven, the feeding control unit 10 stops the driving of the fan 6. When in step S7, the driving of the fan 6 is stopped, the feeding control unit 10 maintains the stop of the driving of the fan 6. In any case, when the sheet S to be fed by the feeding unit 3 is not the coated paper, the feeding control unit 10 does not drive the fan 6 and the heater 7.

Even when in step S2, the feeding control unit 10 determines that the predetermined condition is not satisfied, the processing transfers to step S7. In other words, when the feeding control unit 10 determines that the predetermined condition is not satisfied in the condition determination processing, even if the sheet S to be fed by the feeding unit 3 is the coated paper, the feeding control unit 10 does not drive the fan 6 and the heater 7.

When in step S4, the feeding control unit 10 determines that the temperature of the heater 7 is equal to or less than the threshold temperature (HT≤Tt), the processing transfers to step S8.

In step S8, the feeding control unit 10 determines whether the first elapsed time has reached a first threshold time. When the feeding control unit 10 determines that the first elapsed time has not reached the first threshold time, the processing transfers to step S4. When the feeding control unit 10 determines that the first elapsed time has reached the first threshold time, the processing transfers to step S9.

In step S9, the feeding control unit 10 performs error notification processing for notifying information indicating that an abnormality occurs in the heater 7. Specifically, when the temperature of the heater 7 reaches the threshold temperature before the first elapsed time reaches the first threshold time, the feeding control unit 10 causes the feeding unit 3 to start the feeding of the sheet S. On the other hand, even when the first elapsed time reaches the first threshold time, if the temperature of the heater 7 does not reach the threshold temperature, the feeding control unit 10 performs the error notification processing.

The feeding control unit 10 performs, as the error notification processing, processing for transmitting, to the main control unit MC, the information indicating that an abnormality occurs in the heater 7. When the main control unit MC receives the error notification from the feeding control unit 10, the main control unit MC performs, for example, processing for displaying an error message on the operation panel.

Figure 10:
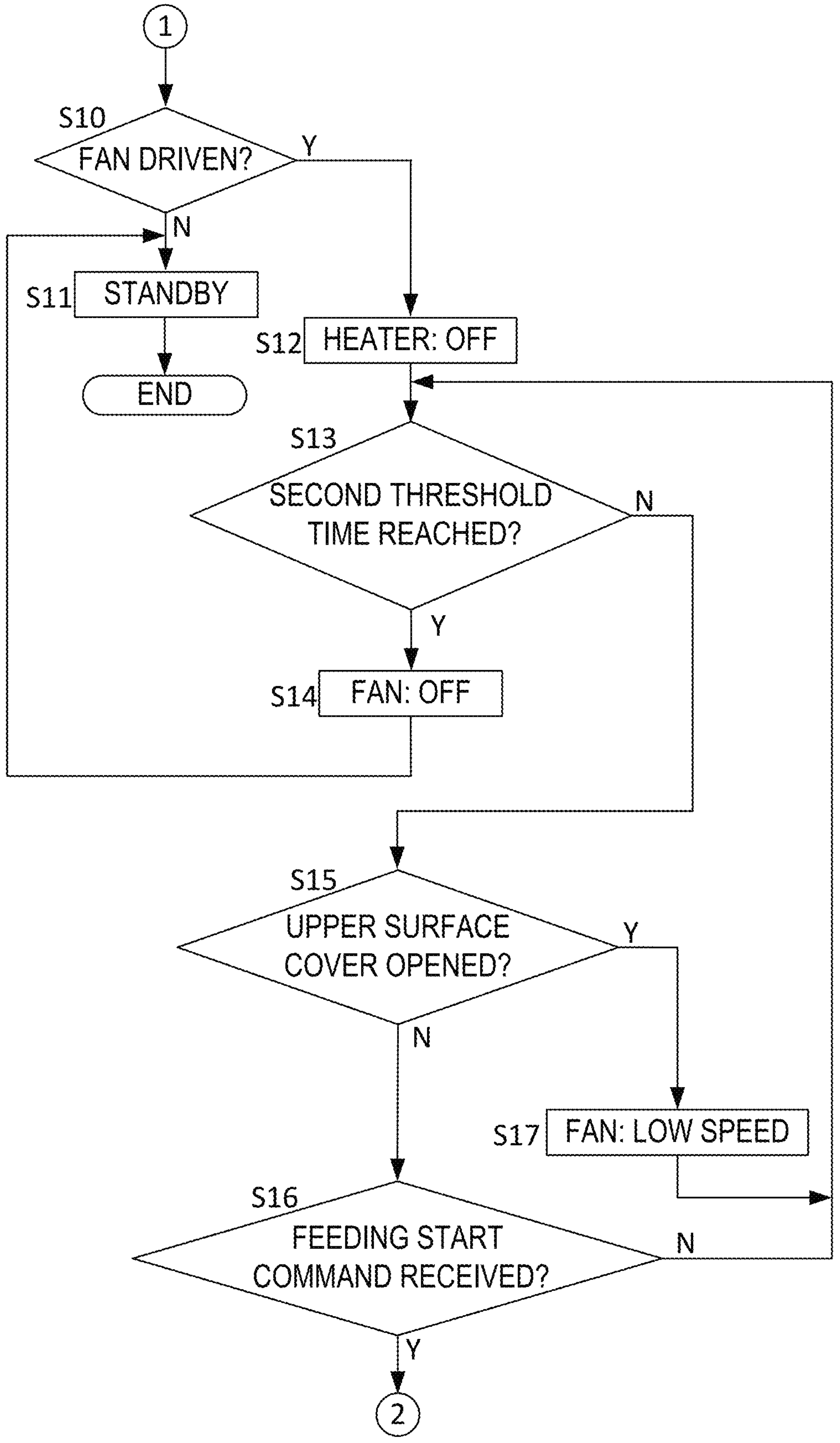
FIG. 10 is a flowchart showing the flow of the processing which is performed by the feeding control unit in the feeding device according to the embodiment.

When the feeding of the sheet S is completed, the processing transfers from step S6 to step S10 (see FIG. 10).

In step S10, the feeding control unit 10 determines whether the fan 6 is driven. That the fan 6 is driven at this point means that the heater 7 is also driven. On the other hand, that the fan 6 is not driven at this point means that the heater 7 is also not driven.

When in step S10, the feeding control unit 10 determines that the fan 6 is not driven, the processing transfers to step S11. In step S11, the feeding control unit 10 is brought into a standby state, and is kept on standby until the reception of a new feeding start command. Here, the feeding control unit 10 does not drive the fan 6 and the heater 7. In other words, the feeding control unit 10 does not drive the heater 7 after the completion of the feeding of the sheet S until the reception of the subsequent feeding start command. When the feeding control unit 10 receives the subsequent feeding start command, the flow in FIG. 9 is started.

When in step S10, the feeding control unit 10 determines that the fan 6 is driven, the processing transfers to step S12. In step S12, the feeding control unit 10 stops the driving of the heater 7 (heater: off). Here, the feeding control unit 10 stops the driving of the heater 7 regardless of whether the internal environment of the feeding device 100 satisfies the predetermined condition (that is, regardless of whether the absolute humidity based on the temperature and humidity sensor 11 is higher than the threshold humidity). However, the feeding control unit 10 continues the driving of the fan 6. In other words, at this point, the fan 6 is driven in a state where the driving of the heater 7 is stopped.

The feeding control unit 10 measures a second elapsed time that is a time which has elapsed since the stop of the driving of the heater 7. In other words, when the processing transfers to step S12, the feeding control unit 10 starts the measurement of the second elapsed time.

In step S13, the feeding control unit 10 determines whether the second elapsed time has reached a second threshold time. When the feeding control unit 10 determines that the second elapsed time has reached the second threshold time, the processing transfers to step S14. In step S14, the feeding control unit 10 stops the driving of the fan 6 (fan: off). Thereafter, the processing transfers to step S11.

When in step S13, the feeding control unit 10 determines that the second elapsed time has not reached the second threshold time, the processing transfers to step S15. In step S15, the feeding control unit 10 determines whether the upper surface cover CV has been opened. The feeding control unit 10 detects that the upper surface cover CV has been opened based on the output of the opening/closing sensor 13.

When in step S15, the feeding control unit 10 determines that the upper surface cover CV has not been opened, the processing transfers to step 516. In step 516, the feeding control unit 10 determines whether the subsequent feeding start command (that is, a new feeding start command) has been received from the main control unit MC.

When in step S16, the feeding control unit 10 determines that the subsequent feeding start command has been received from the main control unit MC, the processing transfers to step S1 (see FIG. 9). On the other hand, when the feeding control unit 10 determines that the subsequent feeding start command has not been received from the main control unit MC, the processing transfers to step S13. In other words, when the second elapsed time reaches the second threshold time after the stop of the driving of the heater 7 before the reception of the subsequent feeding start command from the main control unit MC, the feeding control unit 10 stops the driving of the fan 6.

When in step S15, the feeding control unit 10 determines that the upper surface cover CV has been opened, the processing transfers to step S17. In step S17, while the fan 6 is being driven, the feeding control unit 10 switches the rotation speed of the fan 6 to a low speed (fan: low speed). The feeding control unit 10 drives the fan 6 at a rotation speed lower than the reference rotation speed which is a rotation speed before the upper surface cover CV has been opened. Thereafter, the processing transfers to step S13. In other words, when the upper surface cover CV is opened after the stop of the driving of the heater 7, before the reception of the subsequent feeding start command from the main control unit MC and before the second elapsed time reaches the second threshold time, the feeding control unit 10 drives the fan 6 at a rotation speed lower than a rotation speed before the upper surface cover CV has been opened.

In the present embodiment, when the feeding control unit 10 determines that the predetermined condition is satisfied in the condition determination processing, the feeding control unit 10 starts the driving of the fan 6 and the heater 7, and then causes the feeding unit 3 to start the feeding of the sheet S. In other words, the feeding control unit 10 causes the feeding unit 3 to start the feeding of the sheet S while performing dehumidification for the sheets S to be fed by the feeding unit 3. In this way, it is possible to suppress the simultaneous feeding of the sheets S.

Here, in the present embodiment, when the feeding control unit 10 receives the feeding start command from the feeding destination of the sheet S, the feeding control unit 10 performs the condition determination processing for determining whether the fan 6 and the heater 7 are driven. Furthermore, when the feeding of the sheet S is completed, the feeding control unit 10 stops the driving of the heater 7 regardless of whether the internal environment of the feeding device 100 satisfies the predetermined condition. In other words, the feeding control unit 10 does not drive the heater 7 at least after the completion of the feeding of the sheet S until the reception of the subsequent feeding start command. In this way, an increase in power consumption caused by increasing the driving time of the heater 7 is suppressed. Consequently, it is possible to suppress the simultaneous feeding of the sheets S while suppressing an increase in power consumption in the feeding device 100.

Although in the present embodiment, the driving of the heater 7 is immediately stopped when the feeding of the sheet S is completed, the driving of the fan 6 is continued. In this way, it is possible to suppress an overshoot in the heater 7.

In the present embodiment, as described above, the feeding control unit 10 determines that the predetermined condition is satisfied when the absolute humidity is higher than the threshold humidity. In this way, it is possible to easily perform dehumidification in a state where the simultaneous feeding of the sheets S easily occurs.

In the present embodiment, as described above, when the sheet S to be fed by the feeding unit 3 is not the coated paper, the feeding control unit 10 does not drive the fan 6 and the heater 7. Furthermore, when the feeding control unit 10 determines that the predetermined condition is not satisfied in the condition determination processing, even if the sheet S to be fed by the feeding unit 3 is the coated paper, the feeding control unit 10 does not drive the fan 6 and the heater 7. In other words, only when the simultaneous feeding of the sheets S easily occurs, the fan 6 and the heater 7 are driven. In this way, it is possible to further suppress power consumption.

In the present embodiment, when the temperature of the heater 7 reaches the threshold temperature before the first elapsed time reaches the first threshold time, the feeding control unit 10 causes the feeding unit 3 to start the feeding of the sheet S. On the other hand, even when the first elapsed time reaches the first threshold time, if the temperature of the heater 7 does not reach the threshold temperature, the feeding control unit 10 performs the processing which notifies an error. Here, when an abnormality such as a broken wire occurs, the temperature of the heater 7 does not reach the threshold temperature. Hence, even when the first elapsed time reaches the first threshold time, if the temperature of the heater 7 does not reach the threshold temperature, the processing which notifies an error is preferably performed.

In the present embodiment, when as described above, the second elapsed time reaches the second threshold time after the stop of the driving of the heater 7 before the reception of the subsequent feeding start command from the feeding destination of the sheet S, the feeding control unit 10 stops the driving of the fan 6. In this way, it is possible to suppress unnecessary continuous driving of the fan 6.

In the present embodiment, when as described above, the feeding control unit 10 detects that the upper surface cover CV has been opened based on the output of the opening/closing sensor 13 after the stop of the driving of the heater 7, before the reception of the subsequent feeding start command from the feeding destination of the sheet S and before the second elapsed time reaches the second threshold time, the feeding control unit 10 drives the fan 6 at a rotation speed lower than a rotation speed before the upper surface cover CV has been opened. Here, that the upper surface cover CV has been opened indicates that the operation for setting the sheets S on the set plate 1 is performed. When the operation for setting the sheets S is performed, if an airflow is generated on the set plate 1, workability deteriorates. Hence, the rotation speed of the fan 6 is lowered. In this way, it is possible to suppress a decrease in the workability.

In the present embodiment, as described above, the fan 6 and the heater 7 are arranged in the width-direction restriction cursor 5. In this way, it is possible to easily apply the hot air to the sheet S.

In the present embodiment, as described above, the heater 7 is assigned to only the fan 6 located on the downstream side in the feeding direction Df. In this way, it is possible to further suppress power consumption. Here, the pickup roller 31 makes contact with the front end side (the downstream side in the feeding direction Df) of the sheets S. In this configuration, when dehumidification for the front end side of the sheets S is not sufficient, the simultaneous feeding of the sheets S easily occurs. Hence, the air which is blown by the fan 6 located on the downstream side in the feeding direction Df is preferably heated.

The embodiment disclosed herein should be considered to be illustrative in all respects and not restrictive. The scope of the present disclosure is indicated not by the description of the embodiment but by the scope of claims, and furthermore, meanings equivalent to the scope of claims and all changes in the scope are included therein.

What is claimed is:

1. A feeding device comprising:

a set plate on which a sheet is set;

a feeding unit that feeds the sheet from the set plate;

a fan that blows air to the sheet on the set plate;

a heater that heats the air to be blown to the sheet on the set plate;

a control unit that controls the feeding of the sheet performed by the feeding unit; and a temperature and humidity sensor that detects an internal temperature and an internal humidity of the feeding device, wherein when the control unit receives a feeding start command from a feeding destination of the sheet, if the sheet to be fed by the feeding unit is coated paper, the control unit recognizes an internal environment of the feeding device based on an output of the temperature and humidity sensor and performs condition determination processing to determine whether the internal environment satisfies a predetermined condition, when the control unit determines that the predetermined condition is satisfied in the condition determination processing, the control unit starts driving of the fan and the heater and then causes the feeding unit to start the feeding of the sheet, when the feeding of the sheet in a state where the fan and the heater are driven is completed, the control unit stops the driving of the heater and continues the driving of the fan regardless of whether the internal environment satisfies the predetermined condition, wherein the control unit measures a second elapsed time that is a time which has elapsed since a stop of the driving of the heater, when the second elapsed time reaches a second threshold time after the stop of the driving of the heater before reception of a feeding start command subsequent to the feeding start command, the control unit stops the driving of the fan, the feeding device further includes:

a cover that is supported to be openable and closable; and an opening/closing sensor that detects opening and closing of the cover, the cover is opened to cause a region on the set plate to be exposed such that the sheet can be set, and the cover is closed to cover the region on the set plate, the control unit causes the feeding unit to feed the sheet in a state where the cover is closed and when the control unit detects that the cover has been opened based on an output of the opening/closing sensor after the stop of the driving of the heater, before the reception of the feeding start command subsequent to the feeding start command and before the second elapsed time reaches the second threshold time, the control unit drives the fan at a rotation speed lower than a rotation speed before the cover has been opened.

2. The feeding device according to claim 1, wherein the internal environment is an absolute humidity, and when the absolute humidity is higher than a threshold humidity, the control unit determines that the predetermined condition is satisfied.

3. The feeding device according to claim 1, wherein when the sheet to be fed by the feeding unit is not the coated paper, the control unit does not drive the fan and the heater.

4. The feeding device according to claim 1, wherein when the control unit determines that the predetermined condition is not satisfied in the condition determination processing, even if the sheet to be fed by the feeding unit is the coated paper, the control unit does not drive the fan and the heater.

5. The feeding device according to claim 1, wherein when the control unit determines that the predetermined condition is satisfied in the condition determination processing, the control unit measures a first elapsed time that is a time which has elapsed since a start of the driving of the heater, when a temperature of the heater reaches a threshold temperature before the first elapsed time reaches a first threshold time, the control unit causes the feeding unit to start the feeding of the sheet and even when the first elapsed time reaches the first threshold time, if the temperature of the heater does not reach the threshold temperature, the control unit performs processing that notifies an error.

6. The feeding device according to claim 1, further comprising:

a restriction cursor that makes contact with an end edge of the sheet on the set plate in a width direction orthogonal to a feeding direction to restrict a displacement of the sheet in the width direction, wherein the fan and the heater are arranged in the restriction cursor.

7. The feeding device according to claim 6, wherein two fans each being the fan and one heater being the heater are provided, the two fans are arranged along the feeding direction and the one heater heats the air to be blown by the fan of the two fans that is arranged on a downstream side in the feeding direction.

8. An image forming system comprising:

the feeding device according to claim 1; and an image forming apparatus coupled to the feeding device, wherein the feeding device feeds the sheet to the image forming apparatus, and the image forming apparatus performs printing on the sheet fed from the feeding device.

* * * * *